United States Patent [19]

Chu

[11] Patent Number: 5,349,778
[45] Date of Patent: Sep. 27, 1994

[54] VORTEX TUBE FOR EXTERMINATING ORGANISMS

[76] Inventor: Cheng Chu, 5373 Bothe Ave., San Diego, Calif. 92122

[21] Appl. No.: 51,577

[22] Filed: Apr. 26, 1993

Related U.S. Application Data

[63] Continuation-in-part of Ser. No. 910,689, Jul. 8, 1992, abandoned.

[51] Int. Cl.⁵ .............................................. A01M 1/20
[52] U.S. Cl. ...................................... 43/124; 43/132.1
[58] Field of Search .................. 43/124, 130, 132.1, 43/144, 107

[56] References Cited

U.S. PATENT DOCUMENTS

| | | | |
|---|---|---|---|
| 3,173,273 | 3/1965 | Fulton . | |
| 3,540,837 | 11/1970 | Pascucci | 43/124 |
| 4,413,756 | 11/1983 | Kirley | 43/132.1 |
| 4,637,161 | 1/1987 | Turner | 43/132.1 |
| 4,688,349 | 8/1987 | Renth | 43/124 |
| 4,817,329 | 4/1989 | Forbes | 43/124 |
| 4,961,283 | 10/1990 | Forbes | 43/124 |
| 5,027,546 | 7/1991 | Tallon | 43/132.1 |
| 5,031,355 | 7/1991 | Ryan | 43/130 |
| 5,058,313 | 10/1991 | Tallon | 43/124 |
| 5,109,628 | 5/1992 | Ellefson | 43/124 |

*Primary Examiner*—P. Austin Bradley
*Assistant Examiner*—Chuck Y. Mah

[57] ABSTRACT

A method and apparatus is disclosed for using sub-freezing cold air and hot air generated from a vortex tube to exterminate pests, mildews or tumors. According to the method and apparatus of the present invention, compressed air is fed into vortex tube to generate a stream of cold air with sub-freezing temperature and a stream of hot air of elevated temperature. These jets of cold and hot air are then delivered to infested places to either cool down or heat up to temperatures lethal to undesirable organisms. Since only compressed air is used in operation, there is no adverse impact on the environment.

4 Claims, 1 Drawing Sheet

VORTEX TUBE FOR EXTERMINATING ORGANISMS

This is a continuation-in-part of application Ser. No. 07/910,689, filed Jul. 8, 1992 now abandoned.

BACKGROUND OF THE INVENTION

1. Field of the Invention

This invention relates to a non-toxic method of exterminating undesirable organisms. More specifically, this invention teaches a method and apparatus utilizing a vortex tube which also has been known as Ranque-Hilsch tube to provide lethal temperatures to destroy undesirable organisms such as insects, termites, mildews or tumors in human body.

2. Description of the Prior Art

Most lenders require that homes be certified termite-free when sold. In the art as practiced today there are many well known techniques for inspecting a dwelling to discover and locate termites. These include visual inspection, acoustic techniques and fiber optics which are successful in determining the location of colonies of termites that should be removed and exterminated.

Undesirable organisms such as termites, insects, mildews and rodents are conventionally destroyed by chemical means. For example, termites are commonly treated by tenting the complete structure and utilizing fumigants such as methyl bromide. Tenting a structure is both time-consuming and disruptive to residents. A minimum of two or three days is necessary to allow the poisons to thoroughly permeate the entire structure. Accidental deaths caused to exterminators and others who inadvertently are overcome and killed by the handling or mishandling poisonous fumigants are occasionally reported in the news. In addition, some of the most widely used chemicals have been linked to birth defects and cancer. Consequently, chlordane is banned for use against termites, methyl bromide and sulfuryl fluoride (Vikane) are more tightly regulated. Based on recent studies that show methyl bromide to be more destructive to the Earth's ozone layer than chlorofluorocarbons (CFC), some environmental groups are calling for a ban on chemicals and searching for alternative environmental-safe methods.

Any of the organisms including insects, termites, mildews and rodents, has a normal temperature range within which it can survive and thrive. This normal range may vary from species to species. Temperature appreciably outside of the normal range is lethal especially if it is maintained for a long period of time. Very high temperatures will melt or crack the wax layer carried by many insects, and will cause them to dehydrate and die. Very low temperatures will freeze the bodily fluids of many insects and animals, and kill them. The precise mechanism by which organisms perish is of no concern here. Only the fact that organisms perish at either elevated or sub-freezing abnormal temperatures is the point of interest.

Exterminating insects by freezing liquid or by heat has been proposed separately in earlier inventions. In U.S. Pat. No. 5,027,546, Tallon discloses the use of freezing liquid to exterminate insects in structure. A temperature of 0° F. for 5 minutes will kill termites and fire ants. To ensure that all infestation have been destroyed, a temperature of −20° F. is needed. Tank of liquid nitrogen needs to be hauled to work area and gravity is utilized to control the flow into right enclosed place. The feeding port of liquid gas has to be put higher than the infestation area. Since liquid nitrogen can be as cold as −320° F., severe caution is needed in handling it to prevent cold burn. In U.S. Pat. Nos. 4,817,329 and 4,961,283, Forbes discloses extermination of insects by heat. In U.S. Pat. No. 5,058,313, Tallon utilizes heat in exterminating structure infestations. Typically a temperature of 155° F. is used to kill insects. Heat is usually generated by burning flammable fuel such as propane. Extreme caution is required in handling such flammable materials to prevent fire hazard.

Radiation and surgery are the common methods to treat early stage, localized tumors in human body. Abnormally low and high temperatures are also known to be detrimental to tumors. Recently, liquid nitrogen has been used experimentally in some hospitals to treat localized tumors by cooling it down to sub-freezing temperatures.

The application of freezing cold or heat to eliminate mildews is nowhere shown or suggested in any of the prior references or records available to the inventor. In addition, to the best knowledge of the inventor, there has never been an invention that has the ability to offer both freezing and heat treatments in a single unit for exterminating organisms.

SUMMARY OF THE INVENTION

It is therefore one of the objects of the present invention to enable those skilled in the art to have a simple, safe, versatile and environmental-friendly method and apparatus to exterminate objectionable organisms including, but not limited to, insects, termites, mildews and tumors.

Accordingly, one object of the present invention is to teach a non-toxic method to destroy a variety of organisms by sub-freezing air and hot air generated from a single apparatus.

Additionally, it is another object of the present invention to teach a method to increase the lethality to organisms by utilizing both freezing air and hot air from the same apparatus.

A vortex tube is a device capable of separating a stream of compressed air or other gas into a pair of streams of different temperatures. Vortex tubes and their method of operation are disclosed, for example, in U.S. Pat. Nos. 3,173,273 and 3,208,229 to Fulton, and U.S. Pat. No. 1,952,281 to Ranque. Compressed air or other gas from any source enters such a tube and is throttled through nozzles to produce the special temperature change effects. Typical temperature of the cold stream of commercially available vortex tube ranges from 30° F. to −50° F. for a pressurized air at room temperature 70° F. The cold outlet temperature can be adjusted to within one °F. of a desirable temperature. Temperature of typical hot stream spans from 80° F. to over 212° F. Therefore, temperatures lethal to different kind of organisms including, but not limited to, termites, fleas, fire ants, mildews, and rodents may be easily obtained from a vortex tube. Since no toxic chemical is used, vortex tubes provide an environment-friendly way to refrigerate and heat. Because there is no moving part nor flammable fuel in the vortex tube, it is easy and safe to operate and maintain. Compressed air is either readily available or can be generated on site by mobil air compressors. There is no need to store or transport either liquid nitrogen or flammable fuels as required in previous inventions. All the advantages in exterminating organisms by cold and heat treatments, such as easy preparation, no tenting of the structure, no messy clean up, remain valid in present invention.

Other objects and advantages of the present invention will be apparent and suggest themselves to those skilled in the art, from a reading of the following specification and claims, taken in conjunction with the accompanied drawings.

Figure 1:
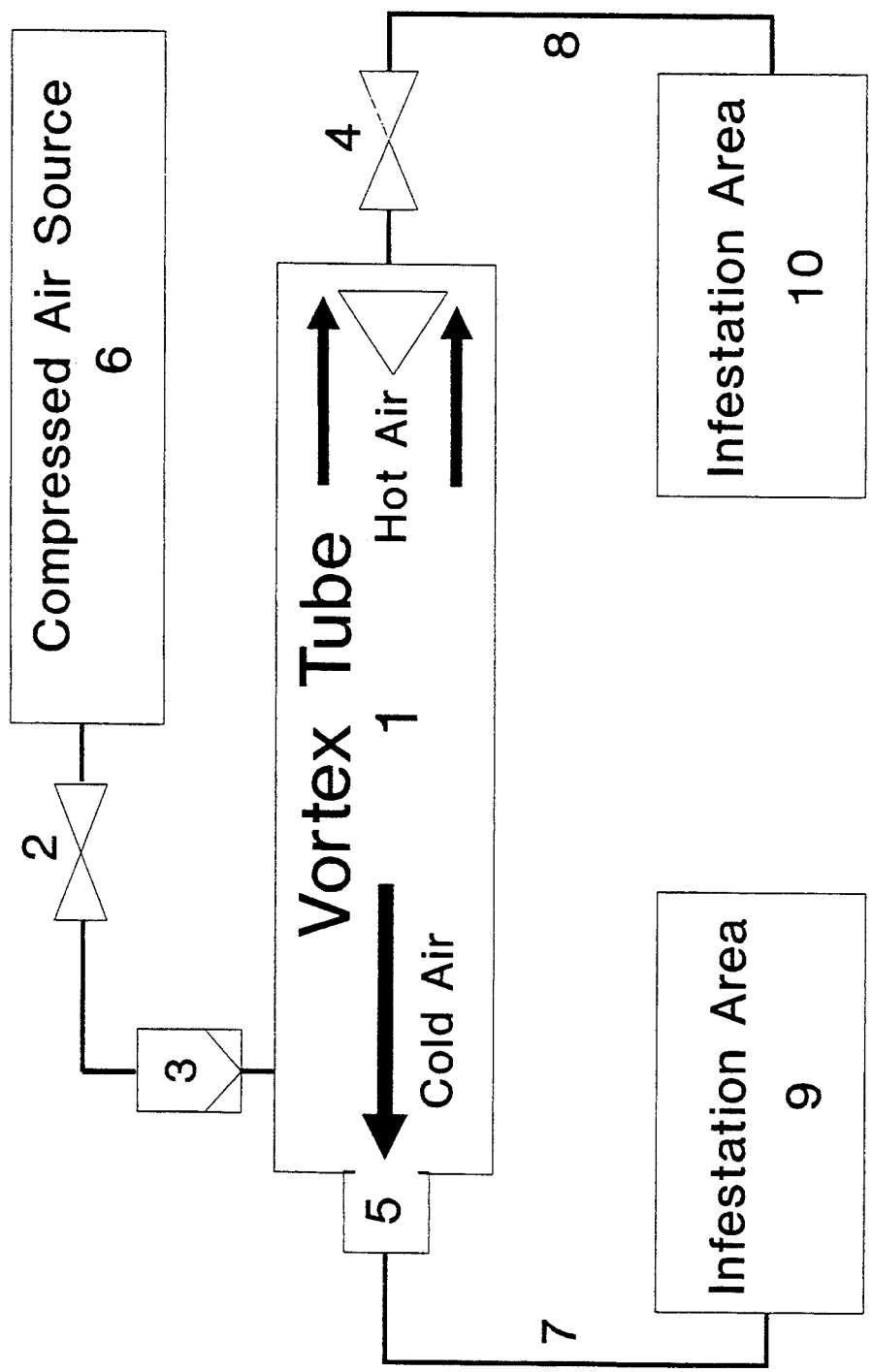
FIG. 1 is a schematic illustration of an embodiments of the present invention.

Reference Numerals In Drawings
 10 vortex tube
 12 inlet valve
 13 filter
 14 control valve
 15 central orifice
 16 compressed air source
 17 assembly of hoses, pipes, and valves for cold air
 18 assembly of hoses, pipes, and valves for hot air
 19 infestation area one
 20 infestation area two

DESCRIPTION OF THE PREFERRED EMBODIMENT

Referring to FIG. 1, a system to exterminate organisms compromises a vortex tube 10 and various hoses, pipes and connectors. Compressed air from suitable source 16 passing through the inlet valve 12 and a filter nozzle 13, is led into a vortex tube 10. Filter 13 is optional and is used to prevent pollutants from getting into vortex tube 10. The air is divided into a cold stream and a hot stream in vortex tube 10. The cold air leaves the central orifice 15 near the entrance nozzle, while the hot air discharges at the periphery at the far end of the tube. The flow rate of the hot air, and thus the cold air, can be controlled by the control valve 14 at hot air outlet. The temperatures of hot air and cold air may be controlled by adjusting the inlet air pressure at source 16 together with tuning the percentage of hot air flow at valve 14. The cold air and hot air can then be delivered to desirable places via assemblies 17 and 18 of suitable hoses, pipes, and valves. The cold air can be used to cool down enclosed infestation area 19 to a sub-freezing lethal temperature for a long enough period to exterminate objectionable organisms. Similarly, hot air can be utilized to heat up enclosed infestation area 20 to a elevated lethal temperature for a long span of time to eliminate undesirable organisms. Since no gravitational force is utilized in delivery of coldness, this invention is much flexible in placing the entrance point to enclosed infestation area and much effective in filling up voids of different orientations.

The details relating to components for drilling holes, monitoring the temperature, and other elements such as valves, hoses, pipes, and connectors of exterminating system are readily available through conventional means and are well known by those skilled in the art. They are not illustrated or described in detail for purpose of clarity.

While the invention has been shown and described with reference to the embodiments above, it will be understood by those skilled in the art that various changes in forms and details may be made therein without departing from the essence, scope, and teaching of the invention. For example, any type of gas may be used, such as air, helium, or nitrogen. Accordingly, the invention disclosed herein is to be limited only as specified in the following claims.

I claim:
1. A method for exterminating organisms comprising:
 locating the infestation area;
 feeding compressed air to vortex tube to generate a cold stream of air with sub-freezing temperature and a hot stream of air with elevated temperature;
 delivering said cold stream of air to infestation area; and
 monitoring and maintaining temperature of infestation area to a sub-freezing lethal range for a long enough period to exterminate organisms at infestation area.

2. A method for exterminating organisms comprising:
 locating the infestation area;
 feeding compressed air to vortex tube to generate a cold stream of air with sub-freezing temperature and a hot stream of air with elevated temperature;
 delivering said hot stream of air to infestation area; and
 monitoring and maintaining temperature of infestation area to a elevated lethal range for a long enough period to exterminate organisms at infestation area.

3. A method according to claim 1 or 2, using both the cold air and the hot air simultaneously at two different infestation areas.

4. A method according to claim 1 or 2, using the cold air and the hot air in sequence at the same infestation area.

* * * * *